T. D. STANLEY.
STEERING WHEEL LOCK.
APPLICATION FILED NOV. 17, 1919.
1,395,608.
Patented Nov. 1, 1921.
2 SHEETS—SHEET 1.
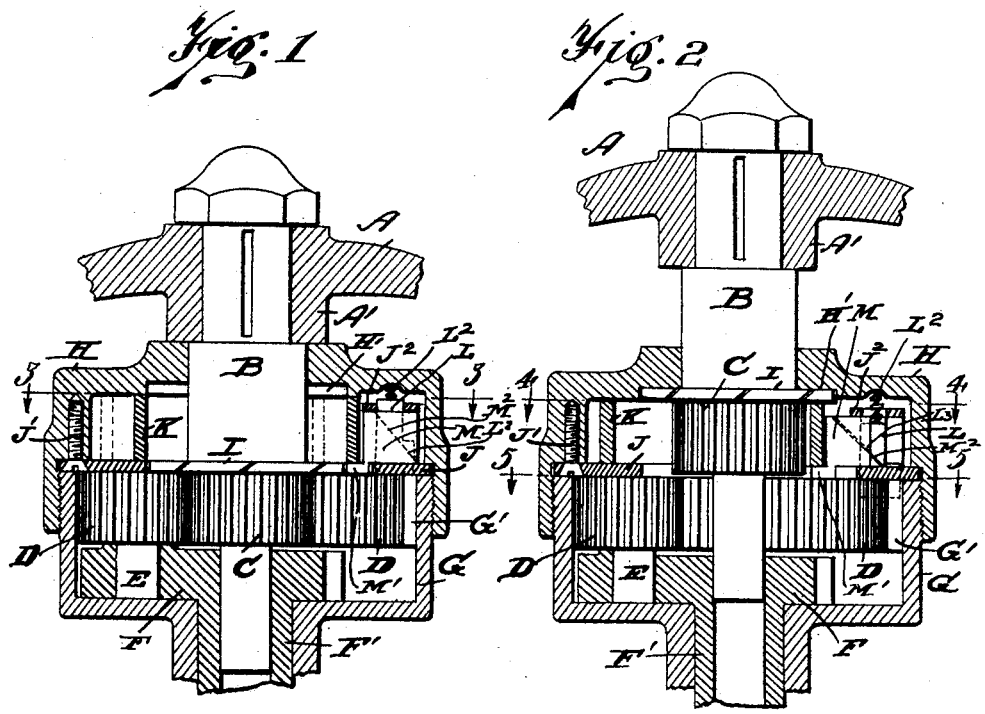
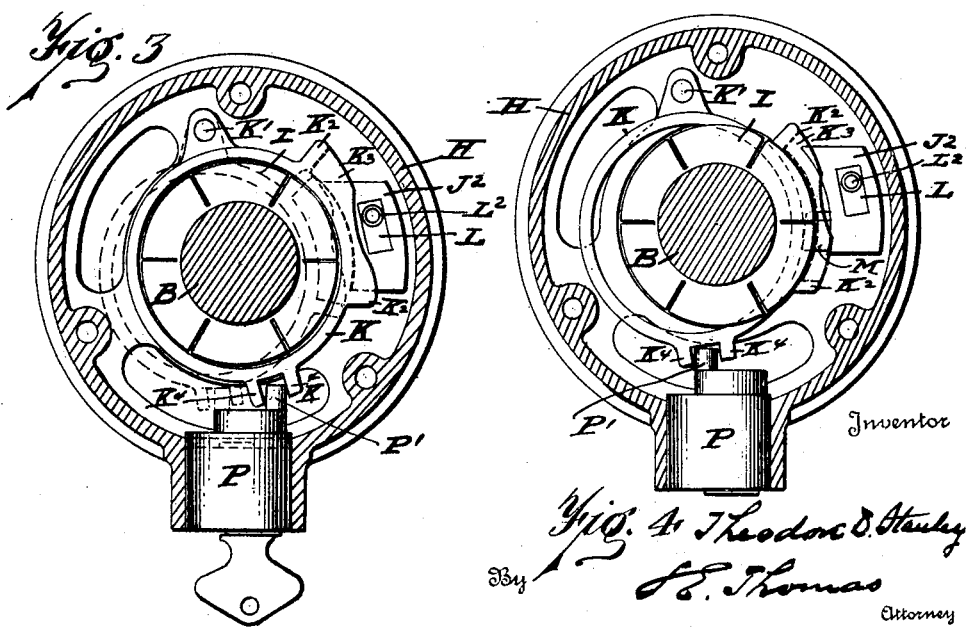

T. D. STANLEY.
STEERING WHEEL LOCK.
APPLICATION FILED NOV. 17, 1919.

1,395,608.

Patented Nov. 1, 1921.
2 SHEETS—SHEET 2.

Inventor
Theodore D. Stanley

By S. B. Thomas

Attorney

UNITED STATES PATENT OFFICE.

THEODORE D. STANLEY, OF DETROIT, MICHIGAN, ASSIGNOR TO LELAND LOCK COMPANY, OF DETROIT, MICHIGAN, A CORPORATION OF MICHIGAN.

STEERING-WHEEL LOCK.

1,395,608.  Specification of Letters Patent.  Patented Nov. 1, 1921.

Application filed November 17, 1919. Serial No. 338,615.

*To all whom it may concern:*

Be it known that I, THEODORE D. STANLEY, citizen of the United States, residing at Detroit, county of Wayne, State of Michigan, have invented a certain new and useful Improvement in Steering-Wheel Locks and declare the following to be a full, clear, and exact description of the same, such as will enable others skilled in the art to which it pertains to make and use the same, reference being had to the accompanying drawings, which form a part of this specification.

My invention relates to a steering wheel lock for motor driven vehicles, shown in the accompanying drawings and more particularly pointed out in the following specification and claims.

This invention is designed as an improvement on that described in Letters Patent No. 1,304,516, issued to me May 20, 1919.

In the patent referred to an arc-shaped swinging arm is employed to close over or under the flange located upon the stub shaft of the steering wheel, to maintain the pinion either in a meshed or demeshed relation to the train of gears which operably connect the steering wheel with the steering post.

It has been found in practice however that when the pinion carried by the stub shaft of the steering wheel is thus supported in demeshed relation to the other gears, that a maliciously inclined person may bend the flange above the pinion sufficiently by hammering upon the end of the stub shaft supported in the hub of the steering wheel, to force the arc-shaped swinging arm to one side, so as to permit the pinion to enter again into meshed relation with the other gears to control the operation of the car.

It is therefore one of the objects of the present invention to provide an annular swinging member which may not be forced aside to permit the unauthorized entry of the pinion into meshed relation with the co-operating gears connecting the steering wheel with the steering post.

A further object is to provide a flange which while adapted to maintain the central pinion in either a meshed or demeshed relation to the other gears, is mutilated sufficiently that it will quickly crumple under the blows of a hammer applied to the end of the stub shaft that it may not serve to disturb the annular swinging member—employed in the present invention to support the pinion so as to permit the descent of the pinion into meshed relation with the other gears.

A further object of the invention is to provide the annular swinging member with projecting lugs or "horns," connected together by a web portion, adapted to bear upon the wall of the annular plate secured to the cover of the gear case, that the annular swinging member may be supported when overlapping the opening through said annular plate.

A further object of the invention is to provide said annular plate with an upstanding lug adapted to enter a peripheral groove in the barrel of the lock unit that the latter may be secured against removal from the supporting housing of the gear case cover.

A further object is the means employed to prevent the removal of the gear case cover while the steering wheel is held in an inoperative relation to the steering post.

With the foregoing and other objects in view which will appear as the description proceeds, the invention consists in the combination and arrangement of parts and in the details of construction hereinafter described and claimed, it being understood that changes may be made in the precise embodiment of the invention herein shown without departing from the spirit of the same.

In the accompanying drawings forming part of this specification:

Figure 1 is a vertical sectional view through a fragment of a steering wheel and planetary gear case, showing the steering wheel operably connected with the steering post.

Fig. 2 is a similar view with the steering wheel raised as when released from control of the steering post.

Fig. 3 is a horizontal sectional view on line 3—3 of Fig. 1.

Fig. 4 is a horizontal sectional view on line 4—4 of Fig. 2.

Figure 5:
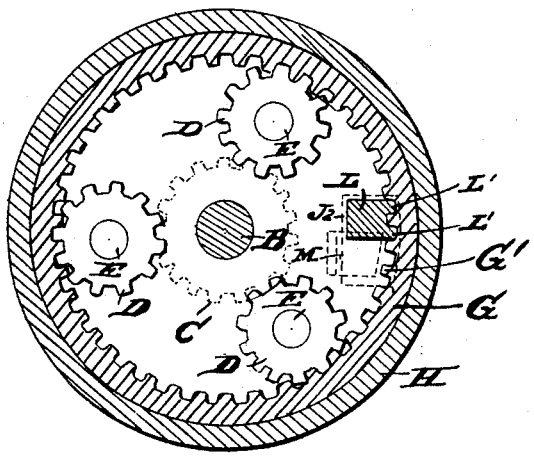
Fig. 5 is a horizontal sectional view on line 5—5 of Fig. 2.

Referring now to the letters of reference placed upon the drawings:—

A, denotes a steering wheel and A', its hub keyed to the stub shaft B. C, indicates a pinion secured to the stub shaft and normally in mesh with a plurality of gears D, carried upon studs E, secured to a plate F, at the top of the post F', into which the lower end of the stub shaft extends.

G, is a gear case having an internal gear G', on its inner periphery with which the gears D, are in mesh.

The foregoing is briefly descriptive of the well known "Ford" steering gear and will require no further description here.

H, denotes the annular cover screwed to the gear case G, and adapted to receive the pinion C, when manually lifted out of mesh with the gears D, by means of the steering wheel A.

I, is a mutilated flange or washer carried by the stub shaft directly above the pinion C, and when the pinion C, is lifted out of mesh with its co-acting gears, it is lodged in the recess H', in the gear case cover H.

J, is an annular plate secured to a shoulder in the cover H, by a plurality of screws J'.

K, is an annular swinging member or annulus shiftable to an eccentric or concentric position with relation to the center pinion C and pivoted at K', to the annular plate adapted to close over the flange I, to maintain the pinion C, in mesh with the gears D,—when the steering wheel is in position to operate the steering post,—or to swing under the flange to support the pinion C, and steering wheel A, in a free or released relation to the operation of the steering post.

K², are lugs or "horns" projecting from the annular swinging member K, onto the wall of the annular plate J, to provide adequate support for the swinging member when a portion of the latter is caused to overlap the opening in said annular plate.

K³, is a web connecting the lugs K², to further strengthen the swinging element against injury. K⁴, are lugs projecting from the swinging member K, between which extends a stud P', carried by a suitable key actuated rotatable locking unit P, supported by a suitable housing H', integral with the cover H.

L, denotes a vertically slidable bolt,—supported in a suitable housing J², projecting upwardly from the annular plate J,—having one or more teeth L', adapted to engage the teeth of the internal gear G'.

L², indicates an expansion spring, (supported in a recess formed in the bolt L, and extending into a like recess provided therefor in the wall of the cover H,) to force the slidable element downwardly so that its teeth may engage the teeth of the internal gear G, and also to cause it to enter between the gears D, to prevent the removal of the gear case cover when the steering wheel is supported in an inoperative relation to the steering post.

M, is a horizontally slidable element having a projecting tongue M', extending beneath the annular swinging ring K, and also an inclined wall M², adapted to be acted upon by a like inclined wall L³, projecting from the side of the vertically slidable bolt L.

J³, is an upstanding lug, integral with the plate J, projecting into a peripheral groove in the barrel of the locking unit P, to secure the latter against malicious removal from the cover of the gear case and to insure the proper axial assembly.

H³, is a screw extending through the wall of the cover (see Fig. 6) impinging upon the threads of the gear case to secure the cover in a predetermined position with respect to the gear case.

Figure 6:
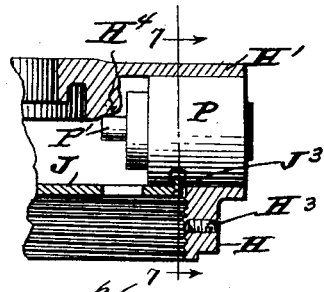
Fig. 6 is a detail sectional view showing the means employed to secure the lock unit against removal.
Figure 7:
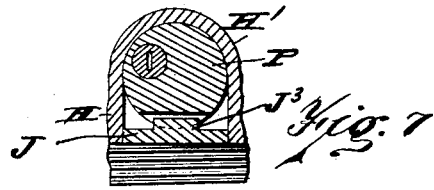
Fig. 7 is a detail cross-sectional view on line 7—7 of Fig. 6.
Figure 9:
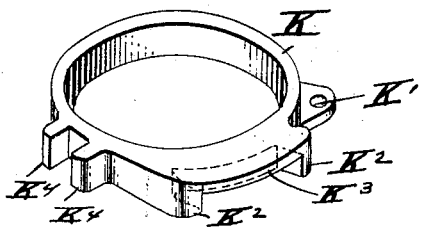
Fig. 9 is a perspective view of the annular swinging member.
Figure 8:
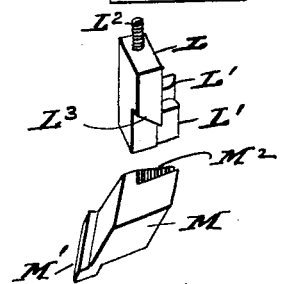
Fig. 8 is a detail perspective view of the bolt and co-acting element for securing the cover of the gear case against removal.

To limit the degree of rotation of the stud P', carried by the locking unit P, the wall of the cover H, is adapted to intercept its line of travel, as indicated at H⁴, in Fig. 6.

Having now pointed out the several parts by reference letters, the construction and operation will be readily understood.

It will be first assumed that the steering wheel is operably connected with the steering post and that it is desired to render the same inoperative for actuating the latter.

To affect this result, the annular swinging arm K, is shifted by means of the key actuated locking element P, so as to permit the pinion C, to be manually lifted by means of the steering wheel out of mesh with the planitary gears D.

Upon the flange I, entering the recess H', in the cover, the annular swinging member K, may be shifted under the flange, through the operation of the key operated locking element P. The key is thereupon withdrawn from the lock,—the central pinion carried by the stub shaft of the steering wheel being now supported by the swinging element K, in demeshed relation to the planetary gearing connecting it to the steering post. Upon the flange carried by the stub shaft of the steering wheel entering the recess in the cover of the gear case, (see Fig. 2) the vertically slidable bolt L, is free to move downwardly under the action of the spring L², the teeth of the bolt engaging the teeth of the internal gear, thereby securing the cover against removal from the gear case. The downward movement of the bolt L, serves also to force the horizontally slidable bolt M, beneath the annular swinging member K, through the combined action of the inclined walls M², and L³, of the respective members;—the annular swinging member K, is thus secured in its adjusted position until released through the manual operation of the key locking element P.

To return the steering wheel to operative control of the steering post, the key is inserted in the locking element P, and the annular swinging member K, shifted to the position shown in full lines in Figs. 1 and 3, the steering wheel is then lowered to the position therein shown and the annular swinging element closed over the flange I, as indicated in dotted lines, thus locking the wheel in an operative relation to the steering post. Upon the annular swinging member K, being shifted to the position shown in full lines in Fig. 1, through the operation of the key of the locking unit, the bolt M, is forced to return to its initial position thereby pushing upwardly the bolt L, against the action of its spring, thus releasing the cover H, that it may be removed from the gear case if necessary.

Figure 10:
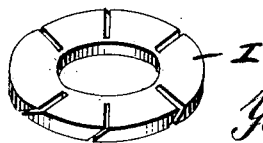
Fig. 10 is a perspective view of the mutilated flange, or washer.

By mutilating or notching the flange I, as shown in Fig. 10, it is adapted to crumple under the blows of a hammer applied to the end of the stub shaft of the steering wheel without causing the annular swinging member to shift so that the steering wheel may be forced from an inoperative to an operative relation to the steering post.

So also by providing the annular swinging member with projecting lugs or "horns," adapted to bear upon the wall of the annular plate J,—when the ring overlaps the opening in the latter, the parts may be maintained in their proper relation against the blows of a hammer maliciously applied to the end of the stub shaft of the steering wheel.

Having thus described my invention, what I claim is:—

1. In a device of the character described, the combination of a steering post fixed against lengthwise movement, a gear case carried by said post, a steering wheel supported by a stub shaft adapted for lengthwise movement with reference to the steering post, planetary gearing housed in the gear case for operably connecting the stub shaft with the post, a swinging annulus completely encircling the stub shaft and one of said gears and shiftable to a concentric or an eccentric position and adapted to maintain the steering wheel in either an operative or an inoperative relation to the steering post, and manually operable means for shifting the position of the swinging annulus.

2. In a device of the character described, the combination of a steering post fixed against lengthwise movement, a gear case carried by the post, a removable cover secured to the case, a steering wheel supported by a stub shaft adapted for lengthwise movement with reference to the steering post, a pinion carried by the stub shaft, gearing housed in the gear case for operatively connecting the pinion of the stub shaft with the steering post, a washer carried by the stub shaft, an annulus completely encircling the said shaft and the said pinion and shiftable to a concentric or eccentric position and adapted to swing either over or under the washer to maintain the steering wheel in either an operative or an inoperative relation with the steering post, and key operated means for manually shifting said annulus.

3. In a device of the character described, the combination of a steering post fixed against lengthwise movement, a gear case carried by the post, a removable cover secured to the gear case, a steering wheel supported by a stub shaft adapted for lengthwise movement with reference to the steering post, a pinion carried by the stub shaft, suitable gearing housed in the gear case for operably connecting the pinion of the stub shaft with the steering post, a washer carried by the stub shaft, an annular plate secured to the cover, a swinging annulus pivoted to the annular plate completely encircling the shaft and shiftable to a concentric or an eccentric position and provided with projecting lugs adapted to bear upon the wall surrounding the opening in the annular plate, and key operated means for actuating the swinging annulus.

4. In a device of the character described, the combination of a steering post fixed against lengthwise movement, a gear case carried by the post, an annular cover secured to the gear case, a steering wheel supported by a stub shaft adapted for lengthwise movement with reference to the steering post, a pinion carried by the stub shaft, suitable gearing housed in the gear case for operably connecting the pinion of the stub shaft with the steering post, a washer carried by the stub shaft, an annular plate secured to the cover, a swinging annulus pivoted to the annular plate completely encircling the shaft and shiftable to a concentric or an eccentric position and having projecting lugs adapted to bear upon the wall of the annular plate, a web connecting said lugs, and key operated means for actuating said swinging annulus.

5. In a device of the character described, the combination of a steering post fixed against lengthwise movement, a gear case carried by said post, a removable cover secured to the gear case, a steering wheel supported by a stub shaft adapted for lengthwise movement with reference to the steering post, a pinion carried by the stub shaft, gearing housed in the gear case for operably connecting the pinion of the stub shaft with the steering post, a mutilated washer adapted to readily bend carried by the stub shaft, means adapted to be swung either over or under said mutilated or bendable washer to maintain the steering wheel in an operative or an inoperative relation to the steering post as required, and key operated means for manually shifting said last named means.

6. In a device of the character described, the combination of a steering post fixed against lengthwise movement, a gear case carried by the post, an annular cover screwed to the gear case, a steering wheel supported by a stub shaft adapted for lengthwise movement with reference to the steering post, a pinion carried by the stub shaft, suitable gearing housed in the gear case for operably connecting the pinion of the stub shaft with the steering post, a grooved or mutilated washer, adapted to be easily bent, carried by the stub shaft, an annular plate secured to the cover, a swinging annulus pivoted to the annular plate, and key operated means for actuating said swinging annulus.

7. In a device of the character described, the combination of a steering post fixed against lengthwise movement, a gear case carried by the post, an annular cover screwed to the gear case, a steering wheel supported by a stub shaft adapted for lengthwise movement with reference to the steering post, a pinion carried by the stub shaft, suitable gearing housed in the gear case for operably connecting the pinion of the stub shaft with the steering post, a washer grooved radially at an angle to its face, whereby the several sections formed by said grooves may overlap each other when bent or crushed through blows applied acting upon its face.

8. In a device of the character described, the combination of a steering post fixed against lengthwise movement, a gear case carried by the post, an annular cover secured to the gear case, a steering wheel supported by a stub shaft adapted for lengthwise movement, a pinion carried by the stub shaft, suitable planetary gearing housed in the gear case for connecting the pinion of the stub shaft with the steering post, a swinging element adapted to maintain the steering wheel in either an operative or an inoperative relation to the post, means for manually shifting said swinging element, a spring actuated vertically movable bolt housed in the cover of the gear case provided with teeth adapted to automatically enter the gear case to secure the cover against removal from said case and interlock with the internal gear of the planetary gearing upon the steering wheel being raised to an inoperative relation to the steering post, and a horizontal bolt having an inclined face adapted to coöperate with an inclined face on the vertically movable spring actuated bolt, said horizontal bolt being adapted to bear against said swinging element, whereby upon the manual operation of the swinging element the bolts are returned to their initial positions.

9. In a device of the class described, a steering post, a gear case carried by the post, a chambered cover secured to the case, gearing for operating the post housed by the casing and its chambered cover, a swinging annulus pivoted in the chambered cover and completely encircling the shaft of the said gear and adapted to hold the gearing operative or inoperative as required, means located within the chambered cover adapted to enter the gear case to secure the chambered cover against removal from the gear case, and manually operable means for actuating the swinging annulus.

In testimony whereof I sign this specification in the presence of two witnesses.

THEODORE D. STANLEY.

Witnesses:
 SAMUEL E. THOMAS,
 LOUIS F. HAWKINS.